United States Patent [19]

Kurahashi et al.

[11] Patent Number: 5,346,771
[45] Date of Patent: Sep. 13, 1994

[54] CURABLE PHOSPHAZENE COMPOSITIONS AND COATED ARTICLES

[75] Inventors: Akihiko Kurahashi; Masahiro Kitayama, both of Sodegaura, Japan

[73] Assignee: Idemitsu Petrochemical Company Limited, Tokyo, Japan

[21] Appl. No.: 84,916

[22] Filed: Jul. 1, 1993

Related U.S. Application Data

[62] Division of Ser. No. 512,285, Apr. 20, 1990, Pat. No. 5,280,090.

[30] Foreign Application Priority Data

Apr. 26, 1989 [JP] Japan .................................. 1-107984

[51] Int. Cl.$^5$ ................................................ B32B 9/04
[52] U.S. Cl. ..................... 428/447; 525/479; 525/538
[58] Field of Search ............... 525/479, 538; 526/276; 428/447

[56] References Cited

U.S. PATENT DOCUMENTS 4,073,825  2/1978  Dieck et al. .
4,640,849  2/1987  Woods et al. .
4,710,549  12/1987  Pettigrew .
4,720,533  1/1988  Pettigrew .

FOREIGN PATENT DOCUMENTS 0307861  3/1989  European Pat. Off. .
59-2449   1/1984  Japan .
61-47406  3/1986  Japan .
63-241075 10/1988  Japan .
2032187   1/1990  Japan .

OTHER PUBLICATIONS

Chemical Abstracts, vol. 95, No. 2, Jul. 13, 1981, p. 33, Abstract No. 8174s.

*Primary Examiner*—Bernard Lipman
*Attorney, Agent, or Firm*—Armstrong, Westerman, Hattori, McLeland & Naughton

[57] ABSTRACT

A curable phosphazene composition contains a curable phosphazene compound and a silicone-modified curable compound. The curable phosphazene composition is coated on a substrate and cured to form a coated article. The cured coating is excellent in surface hardness, slip properties and water repellency.

5 Claims, No Drawings

CURABLE PHOSPHAZENE COMPOSITIONS AND COATED ARTICLES

This is a division of U.S. patent application Ser. No. 07/512,285 filed Apr. 20, 1990, now U.S. Pat. No. 5,180,090.

BACKGROUND OF THE INVENTION

1. Field of the Invention

The present invention relates to a curable phosphazene composition and an article coated with the same.

2. Description of Related Art

Curable resins have heretofore been used as coating materials or protective layers because of their ready curability by heat or active energy rays radiated. In particular, curable resins containing a (meth)acryl group have generally been employed in wide fields because of their ready curability and their transparency and hardness, when coated and cured. Generally speaking, however, such (meth)acryl group containing curable resins, when coated and cured, present the problems that they are insufficient in adhesion to a substrate and rather poor in surface water repellency, slip properties, mold release characteristics and so on.

Further, Japanese Patent Unexamined Publication No. 115,790/1988 proposes heat-sensitive transfer sheets which contain, as a major component for a heat-resistant slip layer, a silicone-modified resin which is curable by electron rays. This prior publication proposes addition of a polyfunctional monomer in an amount ranging from 20 to 50 parts by weight in order to improve heat resistance, however, the slip layer is insufficient in heat resistance and hardness, and its cure shrinkage is so great that the substrate coated therewith may be caused to be curved or twisted. Therefore, the resulting heat-sensitive transfer sheets are said to be insufficient as a whole.

Japanese Patent Examined Publication No. 2,449/1984 and Japanese Patent Unexamined Publication Nos. 47,406/1986 and 241,075/1988 disclose coating agents which use curable phosphazene compounds.

SUMMARY OF THE INVENTION

The present invention has the object to provide a curable phosphazene composition which can provide its cured coating with sufficient heat resistance, adhesion to the substrate, surface slip properties, mold release performance, water repellency, migration, cure shrinkage and so on.

The present invention has another object to provide a cured article having a cured coating which can satisfy the properties as described hereinabove.

In order to achieve the object, the present invention consists of a coated phosphazene composition comprising a curable phosphazene compound and a silicone-modified curable compound.

In a preferred aspect, the present invention consists of a curable phosphazene composition comprising a curable phosphazene compound and a silicone-modified curable compound having a (meth)acryloyl group.

In order to achieve another object, the present invention consists of a coated article having a cured coating of the phosphazene composition on the surface of the article.

DESCRIPTION OF THE PREFERRED EMBODIMENTS

The curable phosphazene composition according to the present invention comprises the curable phosphazene compound and the silicone-modified curable compound.

a) Curable phosphazene compound

The curable phosphazene compound to be used for the present invention may include a variety of curable phosphazene compounds and may preferably include a compound as represented by the following general formula (I):

where
a and b are real numbers, in which a is greater than 0 and b is equal to or greater than 1, provided, however, that $a+b=2$;
n is equal to or greater than 3;
X is a curable group; and
Y is a non-curable group.

It is noted herein that the general formula (I) representing the curable phosphazene compound is intended in this specification to mean an average representation of a mixture of plural compounds, not a single compound. It is thus to be understood that the a and b are not necessarily restricted to integers and each of them is intended herein to mean the real number including a fraction. The n is intended herein to mean the real number equal to or larger than 3, including a fraction, and preferably ranges from the real number satisfying $3 \leq n \leq 18$. Particularly, the suffix n of 3 or 4 or a cyclic structure with a mixture of the suffix n of 3 and the suffix n of 4 is preferred.

In the above formula (I), the curable group represented by the group X is intended in generic terms to mean a functional group which can be cured by reaction upon radiation of active energy rays such as ultraviolet rays, visible light, electron rays, X-ray or the like and, more specifically, to mean a group having a reactive double bond. The group having the reactive double bond may specifically include, for example, a functional group containing an acryloyl group, a methacryloyl group, a vinyl group or an allyl group, although it may include many others.

More specifically, the functional group containing the acryloyl group or methacryloyl group may include an acryloyloxy group or a methacryloyloxy group, or may be represented by the general formula (II):

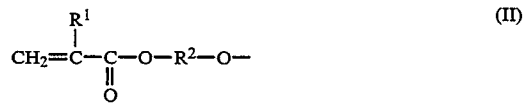

(wherein
$R^1$ is hydrogen atom or methyl group; and
$R^2$ is a linear or branched alkylene group having from 1 to 12 carbon atoms, preferably from 1 to 5 carbon atoms).

The functional group containing the acryloyl group or methacryloyl group may further include a functional group as represented by the following general formula (III):

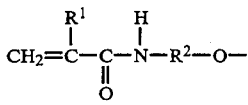

(wherein $R^1$ and $R^2$ have the same meanings as above), or a residue obtainable by removing hydrogen atom from the hydroxy group of a hydroxylalkyl-substituted (meth)acrylamide, or a functional group as represented by the following general formula (IV):

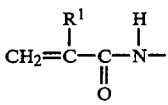

(wherein $R^1$ and $R^2$ have the same meanings as above), or a residue obtainable by removing one hydrogen atom from the amino group of an acrylamide or methacrylamide.

The functional group containing allyl group may include, for example, ally group, alkyloxy group as represented by formula as follows:

$CH_2=CH-CH_2-O-$ and a functional group as represented by the following general formula (V):

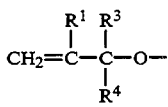

a functional group as represented by the following general formula (VI):

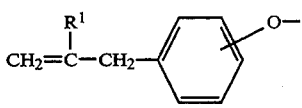

and a functional group as represented by the following general formula (VII):

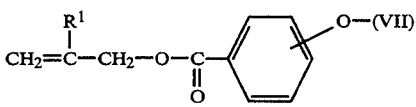

(wherein
$R^1$ has the same meaning as above;
$R^3$ and $R^4$ are identical to or different from each other and each are hydrogen atom or an alkyl group),
or each group being a residue obtainable by removing hydrogen atom from hydroxy group of an allyl compound having one hydroxyl group.

As the curable group represented by X, there may preferably be N-methylolacrylamido group, or a residue obtainable by removing hydrogen atom from $CH_2=CttCONHCH_2OH$, in order to improve adhesion to the substrate.

The non-curable group represented by Y in the general formula. (I) above may include a group containing, for example, hydrogen atom, a halogen atom, a phenoxy group, a halophenoxy group, an alkoxy group, a haloalkoxy group, $-COOR^5$ or $-NHR^5$ (wherein $R^5$ is an alkyl group having from 1 to 11 carbon atoms).

Among these groups, the group containing fluorine atom is preferred in terms of improvement in slip properties of a cured coating and the group containing carbonyl group is preferred in terms of improvement in adhesion of the cured coating.

Furthermore, in order to improve water resistance, abrasion resistance, reduction in water absorption and resistance to discoloration, the non-curable group represented by Y may preferably be a fluoride group as represented by the following general formula:

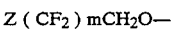

(where
m is an integer from 1 to 4; and
Z is hydrogen atom or fluorine atom)
or a fluoride group as represented by the following general formula:

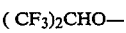

The fluoride group may include, for example, 2,2,2-trifluoroethoxy, 2,2,3,3,3-pentafluoro-l-propoxy, 2,2,3,3,4,4,4-heptafluoro-1-butoxy, 2,2,3,3-tetrafluoro-l-propoxy, 2,2,3,3,4, 4,5,5-octafluoro-1-penfoxy and 1,1,1,3,3,3-hexafluoro-2-propoxy.

In order to mainly improve adhesion and flexibility, the non-curable group represented by Y may preferably include, for example, a residue from a saturated carboxylic acid as represented by the following general formula:

$-O(CH_2)pCOOH$ (where p is 1 to 15); a residue from a carboxylic carboxylic acid as represented by the following general formula:

$-OC_6H_4(CH_2)_qCOOH$
( where q is 0, 1 or 2);

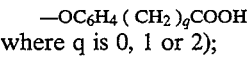

or 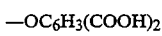
(where $R^6$ is $-OH$ or $-OCH_3$).

More specifically, the saturated carboxylic acid may include, for example, oxyacetic acid, β-hydroxypropionic acid, 4-hydroxyacetic acid, 12-hydroxydecanoic acid, 16-hydroxyhexadecanoic acid or the like. The carbocylic carboxylic acid may include, for example, p-oxybenzoic acid, p-hydroxyphenylacetic acid, p-hydroxyphenylpropionic acid, 4-hydroxyphthalic acid, 2,3-dihydroxybenzoic acid, 4-hydroxy-3-methoxybenzoic acid or the like.

In brief, the substituent X is a group capable of exhibiting the action for curing the phosphazene compound of the general formula (I) upon radiation of active energy rays, while the substituent Y is a group capable of exhibiting the action which can adjust curing performance on top of adjusting physical properties of the cured resin. Hence, various properties of the cured resin consisting of the phosphazene compound can be determined by appropriately selecting the a and b.

It is provided, however, that the phosphazene compound as represented by the general formula (I) above, in which a is 0, cannot be cured so that this compound is excluded from the category to be used for the present invention. It can be noted that the phosphazene compounds of the general formula (I) above, in which a is 2 and b is 0, or the phosphazene compounds having a repeating unit as represented by the following general formula:

—[NP(X)$_2$]— can be used as the curable phosphazene compounds for the present invention.

The curable phosphazene composition according to the present invention may additionally contain, as needed, a curable compound other than the curable phosphazene compound, such as a polyfunctional acrylic monomer, e.g., dipentaerythritol hexaacrylate.

b) Silicone-modified curable compound:

The silicone-modified curable compound to be used for the present invention may be any compound having a silicone (silane) group and preferably a (meth)acrylate group in one molecule. In order to improve slip properties, the compound preferably has a silicone group as represented by the following general formula:

—(SIR$^7_2$—O—)$_r$—

(where
R$^7$ is a substituted or unsubstituted, linear or branched alkyl group; and
r is a number of repeating units)
and the (meth)acrylate group. In order to further improve slip properties and attain a large degree of hardness, the compound preferably has the silicone group as represented by the following general formula:

—(SIR$^7_2$—O—)$_r$—

(where R$^7$ and r have the same meaning as above) and a polyfunctional (meth)acrylate group.

Representative examples of the silicone-modified curable compounds may include, for example, a silicone-modified urethane acrylate, (meth)acryloxysilane compound and (meth)acrylate-modified polysiloxane.

The silicone-modified urethane acrylate may be represented by the following general formula:

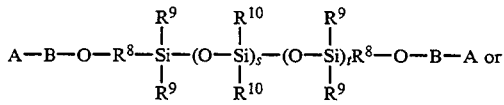

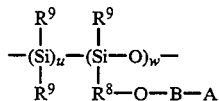

(where
s and t are each from 0 to 4,000;
u is 10 to 1,000;
w is 2 to 100;
B is a group derived from a diisocyanate compound including 2,4-tolylene diisocyanate, methylene diphenyl diisocyanate or hexamethylene diisocyanate, hexamethylene diisocyanate being preferred in terms of less discoloration and high stability;
A is a residue obtainable by removing hydrogen atom from the hydroxyl group of a hydroxy group-containing (meth)acrylate including 2-hydroxylethyl (meth)acrylate, pentaerythritol triacrylate or dipentaerythritol monohydroxypentaacrylate;
R$^8$ is a linear or branched alkylene group or a single bond (in this case, silicon atom being bonded directly to oxygen atom); and
R$^9$ and R$^{10}$ are identical to or different from each other and each is methyl or a phenyl group).

The (meth)acryloxysilane compound may include, for example, γ-methacryloxypropyltrimethoxysilane and γ-methacryloxypropylmethyldimethoxysilane.

The (meth)acrylate-modified polysiloxane may be a compound having a silicone (silane) group and a (meth)acrylate group in its own molecule and include a compound as represented by the following general formula:

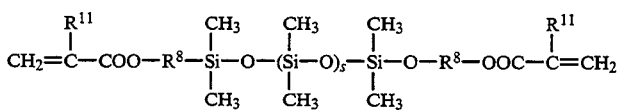

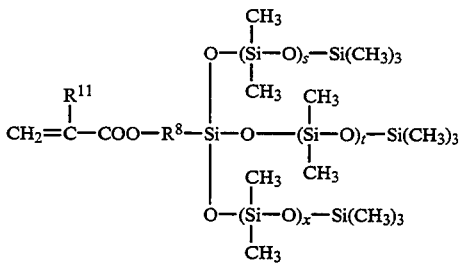

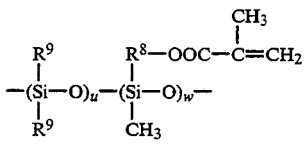

(where
R$^8$, R$^9$, s, t, u and w have the same meanings above;
R$^{11}$ is hydrogen atom or methyl; and
x is 0 to 4,000.)

c) Amounts of Components

Although amounts of the curable phosphazene compound and the silicone-modified curable compounds in the curable phosphazene composition are not restricted to a particular range, it is convenient that they may vary with the kind of the silicone-modified curable compound to be used. The amount of the curable phosphazene compound may range usually from 10 to 99.5 parts by weight, preferably from 20 to 99 parts by weight, more preferably from 30 to 98 parts by weight, while the amount of the silicone-modified curable compound may range usually from 0.5 to 90 parts by weight, preferably from 1 to 80 parts by weight, more preferably from 2 to 70 parts by weight.

In this case, for instance, if the silicone-modified curable compound is reacted with the polyfunctional acrylic monomer in advance, as in an example as will be described hereinafter, the amount of the monomer may become comparatively larger than the silicone-modified curable compound. Hence, the amount of the silicone-modified curable compound may be determined on the basis of the silicone content in the compound, and the silicone content may range usually from 0.01 to 20% by weight, preferably from 0.02 to 10% by weight, with respect to the total weight of the composition.

If the amount of the curable phosphazene compound would be out of the range as described hereinabove, the objects of the present invention may not be achieved to a sufficient extent.

d) Other Optional Components

The curable phosphazene composition according to the present invention basically comprises the curable phosphazene compound and the silicone-modified curable compound. The composition, however, may contain other optional components, as needed, within the scope which does not impair the objects of the present invention.

The optional components may include, for example, curable compounds, cure accelerators, fillers, stabilizers, solvents, sensitizers, levelling agents, antistatic agents and so on.

(i) Other curable compounds

The kinds of other curable compounds are not restricted to particular ones and may preferably include, for example, a monofunctional monomer, a polyfunctional monomer or a prepolymer, which is copolymerizable with the curable phosphazene compound. More specifically, they may include, for example, compounds having a reactive double bond, such as compounds with an acryloyl group, a methacryloyl group, a vinyl group or an allyl group.

These curable compounds may be used singly or in combination of two or more and in an amount ranging usually from 10 to 300 parts by weight with respect to 100 parts by weight of the curable phosphazene compound to be used.

(ii) Cure accelerators

When ultraviolet or visible rays are used for curing, it is preferred to use, as a cure accelerator, a photopolymerization initiator such as 1-hydroxycyclohexylphenyl ketone, dibenzoyl, benzoylmethyl ether, benzoylethyl ether, p-chlorobenzophenone, p-methoxybenzophenone, benzoyl peroxide, di-tert.-butyl peroxide and camphaquinone. The photopolymerization initiator may be used singly or in combination of two or more and in an amount ranging usually from 0.05 to 10.0 parts by weight with respect to 100 parts by weight of the curable phosphazene compound.

When the curing is performed at ambient or elevated temperatures, it is preferred to use a polymerization initiator including a peroxide or an amine, singly or in combination, The peroxide may include, for example, benzoyl peroxide, p-chlorobenzoyl peroxide, 2,4-dichlorobenzoyl peroxide, t-butylhydroperoxide, di-t-butyl peroxide, dicumyl peroxide, t-butyl peroxyacetake, diacekate, or t-butyl peroxybenzoate. The amine may include, for example, N,N-diethanol-p-toluidine, dimethyl-p-toluidine, p-toluidine, methylamine, t-butylamine, methylethylamine, diphenylamine, 4,4'-dinitrodiphenylamine, o-nitroaniline, p-bromoaniline, or 2,4,6-tribromoaniline.

The total amount of the peroxide and the amine may range usually from 0.05 ko 5.0 parts by weight with respect to 100 parts by weight of tile curable phosphazene compound.

(iii) Fillers

The filler may be inorganic or organic fillers in forms of powders and fibers and may include, for example, silica, glass, metal, ceramics and organic fibers. Additives such as an antioxidant and an ultraviolet absorber may be used.

The kind of the filler to be used may be determined in accordance with a use of the curable phosphazene composition.

In order to ensure optical performance, particularly transparency, of a product from the composition according to the present invention, the inorganic or organic filler may preferably be a filler which does not block active light rays from penetrating, such a filler including, for example, an inorganic filler such as colloidal silica, or an organic filler such as polymethyl methacrylate.

For instance, when the composition according to the present invention is intended to be used for magnetic recording media such as magnetic tapes or floppy discs, magnetic powders may be used as a filler. In this case, the magnetic recording media may be prepared by coating a magnetic layer containing the curable phosphazene composition as a binder on the surface of a flexible polyester substrate such as a film, sheet or tape.

The magnetic powders may include, for example, iron oxides such as y -iron oxide or tri-iron tetroxide, cobalt-containing γ-iron oxide, chrome oxide, pure iron, iron-type alloy such as cobalt-iron-nickel alloy, or nickel-cobalt alloy.

In order to provide a layer cured on a coating material containing the curable phosphazene composition with conductive properties, a conductive material may be blended with the curable phosphazene composition as a filler. Such a conductive material may include, for example, gold, silver, copper, carbon black, graphite or the like.

Further, in order to provide the coated and cured layer of the coating material containing the curable phosphazene composition with absorption of electrical radiation, it is preferred to use a manganese-zinc type ferrite as a filler. In order to provide the layer with electrolysis relaxation, silicon carbide powders may preferably be blended.

(iv) Stabilizers

The stabilizer may include, for example, a polymerization inhibitor such as a hydroquinone, a photostabilizer and an antioxidant.

(v) Solvents

As the solvent, there may be exemplified an organic solvent including, for example, a ketone, e.g., methyl ethyl ketone, methyl isobutyl ketone or cyclohexanone, an aromatic hydrocarbon, e.g., benzene, toluene or xylene, a halogenated hydrocarbon, e.g., chloroform or methylene chloride, an alcohol, e.g., methanol, ethanol, propanol or butanol, or an ether, e.g., tetrahydrofuran or dioxane, or a cellosolve such as ethyl cellosolve or butyl cellosolve. The solvent may be used singly or in combination. Among those solvents as described hereinabove, the ketone or alcohol or a mixture thereof is preferred, and methyl isobutyl ketone or isopropyl alcohol or a mixture with butyl alcohol may conveniently be used.

The ratio of the solvent to the phosphazene compound is not restricted to a particular one and may range usually from 1 to 9 to 9 to 1, by weight. Particularly, the composition containing the organic solvent in the rate to the phosphazene compound ranging from 9 to 1 to 5 to 5 is preferred in terms of workability because of a favorable range of its viscosity.

e) Uses of the curable phosphazene composition:

The curable phosphazene composition according to the present invention can be applied to an article as will be described hereinafter or can be molded and cured in a sheet having a film thickness of 1 to 5 mm or in any other shape.

The coated article may be prepared by coating the surface of a substrate with the curable phosphazene composition according to the present invention and curing the composition coated thereon in appropriate manner.

A material forming the substrate may include, for example, a polyester such as polyethylene terephthalate, polybutylene terephthalate, all aromatic polyester or crystalline polyester; a polymer such as polycarbonate, aromatic polyether ketone, aromatic polyether sulfone, polyarylene sulfide, nylon 6, nylon 66, polyphenylene oxide, polyallylate polysulfone, polyaryl sulfone, polyoxybenzylene, polyether ether ketone, polyether imide, polyimide, polyamidoimide, poly-4-methylpentene, polystyrene, polyethylene, polypropylene, polyvinyl chloride or polymethyl methacrylate; metal; glass; ceramics; wood, plywood, fiber and paper. The kind of the material to be used is determined on the basis of a use of the coated article.

The shape of the substrate may also be determined in accordance with a use of the coated article. For instance, when the coated article is used as a base support for ink ribbons, the coated article is formed into film or tape shapes of 0.1–200μm thickness. When the coated article is used for optical discs, it is formed into disc shapes.

When the coated article is used as a molded article for housing members of office equipment and devices, they are formed into shapes adaptable for such article.

It is preferred to subject the substrate to surface treatment in advance prior to coating in order to enhance or improve adhesion of the cured layer or coating of the curable acryl type resin composition.

The surface treatment to be used for the present invention may be corona discharge treatment, flame treatment, acid washing treatment using nitric acid or the like, or primer treatment for coating a vinyl copolymer with a carboxyl group, an epoxy resin or a phenolic resin.

f) Processes and procedures of coating

The curable phosphazene composition according to the present invention may be coated on the substrate as intact or as a dilution or a mixture with a solvent in conventional manner such as spinner method, spraying, roll coater method, dipping, brushing or the like. When the solvent is used, it is removed after coating.

g) Curing

The curable phosphazene composition coated on the substrate is then cured at ambient or elevated temperatures or by radiation of ultraviolet rays, electron rays, X-rays, gamma rays or the like, thereby forming a cured coating or layer on the surface of the substrate. The curing by radiation of ultraviolet rays is preferred. In this case, it is desired that ultraviolet rays having wavelengths ranging from 200 to 550 nm be irradiated for a time period over 0.1 second, preferably ranging from 1 to 300 seconds. An integrated quantity of light irradiated may usually range from 50 to 5,000 mj/cm$^2$.

When the curing is carried out at elevated temperatures, it is desired that the curing is implemented to an entire extent at the temperature above 100° C.

h) Cured coating or layer

The film thickness of the cured coating or layer may range usually from 0.01 to 1,000μm, preferably from 0.03 to 600μm, more preferably from 0.05 to 200 μm. If the film thickness is thinner than 0.01 μm, the resulting cured coating cannot sufficiently exhibit the mechanical effects and so on, as a protective layer, while the coating having the film thickness over 1,000 μm may reduce flexibility when polyester is used as a substrate.

The present invention will be described in more detail by way of examples, with reference to comparative examples.

EXAMPLES 1–6 AND COMPARATIVE EXAMPLES 1–4

(a) Preparation of curable phosphazene compound A

A 1-liter flask equipped with a thermometer, a stirrer, a dropping funnel and a condenser was charged with 58.0 grams of hexachlorocyclotriphosphazene, 50 ml of toluene and 168 grams of pyridine, and the mixture was stirred.

To this mixture was dropwise added 156 grams of 2-hydfoxyethyl methacrylate from the dropping funnel. The resulting mixture was heated to 60% on a warm bath and the reaction was carried out over the period of 8 hours with stirring. Crystals precipitated were filtered off and the filtrate was washed with water and then dried. The solvent in the filtrate was then removed by distillation under reduced pressures, leaving 136 grams (yield: 91%) of a curable phosphazene compound (A) in a form of pale yellow, viscous liquid.

(b) Preparation of silicone-modified urethane acrylate B

A 1-liter flask was charged with 47.5 grams of polydimethyldiphenylsiloxane terminal diphenylsilanol ("PS084"; CIIISSO K. K. ) and 27.5 grams of methylene diphenyl diisocyanate and the mixture was reacted with stirring over the period of 2 hours by heating it at 40° C. on a warm bath.

After completion of the reaction, a portion of the resulting reaction mixture was taken out and measured for IR absorption. As a result, no absorption peak of the hydroxyl group was observed at about 3,500 cm$^{-1}$.

The flask was then charged with 395 grams of pentaerythritol triacrylate and the mixture was reacted for 8 hours at 60° C. on a warm bath with stirring, thereby yielding a viscous material. The IR measurement has revealed that the viscous material had no absorption of NCO group at about 2,280 cm$^{-1}$.

(c) Preparation of silicone-modified urethane acrylate C

A 1-liter flask was charged with 5 grams of polydimethylsiloxane terminal alcohol ( "BX16-001"; Toray Silicone K.K.) and 1.5 grams of 2,4-tolylenediisocyanate and the mixture was reacted with stirring at 40° C. for 2 hours on a warm bath.

After completion of the reaction, a portion of the reaction mixture was measured for its IR absorption and the IR measurement has revealed no absorption for the hydroxyl group at about 3,500 cm$^{-1}$.

To the flask were added 150 grams of dipentaerythritol hexaacrylate and 100 grams of dipentaerythritol monohydroxypenkaacrylate, and the mixture was stirred for 4 hours by heating it at 60° C. on a warm bath, thereby yielding a viscous material. The IR measurement has revealed that the viscous material had no absorption for NCO group at about 2,280 cm$^{-1}$.

(d) Preparation of silicone-modified urethane acrylate D

A 1-liter flask was charged with 15 grams of polydimethylsiloxane terminal alcohol ("BX16-005"; Toray Silicone K.K.) and 4 grams of hexamethylenediisocyanate and the mixture was reacted with stirring at 40 for 2 hours on a warm bath.

After completion of the reaction, a portion of the reaction mixture was measured for its IR absorption and the IR measurement has revealed no absorption for the hydroxyl group at about 3,500 cm$^{-1}$. To the flask were added 300 grams of pentaerythritoltriacrylate and 300 grams of the curable phosphazene compound A above, and the mixture was stirred for 4 hours by heating it at 60° C. on a warm bath, thereby yielding a viscous material (as a curable phosphazene composition containing the silicone-modified urethane acryla-te D). The IR measurement has revealed that the viscous material had no absorption for NCO group at about 2,280 cm$^{-1}$.

(e) Preparation of curable resin composition

The curable phosphazene composition prepared at amounts as shown in Table 1 below was coated on a polyester film having a film thickness of 188 μm with a bar coater (No. 20). After removal of the solvent in the composition by drying, the coating was irradiated with ultraviolet rays at (150 mj/cm$^2$), thereby producing the polyester film with a cured coat having the film thickness of 2 μm. The evaluation results of this cured coating are shown in Table 2 below.

Evaluation on the following items is made as follows:

1. Adhesion

Crosscut tape test: The cured coating was crosscut with the space of 1 mm to form 100 squares and an adhesive tape was stuck on their surfaces. The adhesion was then rated by the number of the squares peeled off from the polyester film as the adhesive tape was stripped off. For instance, when 50 out of 100 squares were torn off, the adhesion is represented as 50/100.

2. Surface hardness

Taber abrasion test: The degree of haze (Δ haze) was evaluated at the load of 500 grams.

3. Slip property

The test was carried out at the load of 5 grams/cm$^2$ and the slip property was represented as a dynamic friction coefficient (μk).

4. Surface water repellency

The contact angle of purified water was measured with a contact angle measuring device of goniometer type (Elmer K.K.).

5. Migration

The cured coating was allowed to stand at 60° C. for 3 days while it is in contact with the polyester film. Thereafter, the degree of repellency of the polyester film against ink was observed visually.

6. Heat resistance

The evaluation was rated by the time period required for changes of the cured coating at the heater temperature of 280° C.

7. Cure shrinkage

The degree of curvature of the film with the cured coating was observed visually.

COMPARATIVE EXAMPLE 2

Commercially available acryl-type hard coating agent ("FUJIHARD"; Fujikura Kasei K.K.) as the curable resin was coated on the surface of the substrate used in the above examples, and the coating was cured in substantially the same manner as in the above examples. The resulting cured coating was likewise evaluated as above.

As is apparent from the test results as shown in Table 2 below, the cured coatings or layers of Examples 1 to 6 have provided a satisfactory balance of various properties such as adhesion, surface hardness, slip performance, surface water repellency, migration and heat resistance, while the cured coatings or layers of Comparative Examples 1 to 4 have demonstrated an extremely insufficient result for either of those properties.

It is further found that the coated article of Example 6 was extremely lower in yellowing compared to that of Example 1.

As have been described hereinabove, the curable phosphazene composition according to the present invention can provide the coating or coated layer which is excellent in heat resistance, adhesion to the substrate, surface slip properties, mold release performance, water repellency, migration and cure shrinkage. Furthermore, this coating or coated layer has higher adhesive force for a film as substrate. But the film coated with the curable phosphazene composition has few blocking when it is rolled, and has good transfer of ink when it is used as a base film of an ink ribbon. Hence, the coated article obtained by coating and curing the composition on the substrate is remarkably useful for office equipment or devices (such as back coatings of ink ribbons) or as a molded article with a protective layer.

TABLE 1

|  | Ex. 1 | Ex. 2 | Ex. 3 | Ex. 4 | Ex. 5 | Ex. 6 | Co. Ex. 1 | Co. Ex. 3 | Co. Ex. 4 |
|---|---|---|---|---|---|---|---|---|---|
| Curable phosphasene compound A (parts by wt) | 9.5 | 9.5 | 9.5 | 9.5 | 9.5 | 9.5 | 9.5 | — | 10 |
| Silicone compounds*1 (parts by wt) | 10.5 | 10.5 | 1.0 | 1.0 | 1.0 | 10.5 | 1.0 | 10.5 | — |
| Polyfunctional acrylmonomer (parts by wt)*2 | — | — | 9.5 | 9.5 | 9.5 | — | 9.5 | 9.5 | 10 |
| Methylethyl ketone (parts by wt) | 50 | 50 | 50 | 50 | 50 | 50 | 50 | 50 | 50 |
| Butanol (parts by wt) | 25 | 25 | 25 | 25 | 25 | 25 | 25 | 25 | 25 |
| Isopropanol (parts by wt) | 25 | 25 | 25 | 25 | 25 | 25 | 25 | 25 | 25 |
| 1-hydroxycyclohexylphenyl Ketone (Photo-curing intiator) (parts by wt) | 1 | 1 | 1 | 1 | 1 | 1 | 1 | 1 | 1 |

*1 Silicone Compounds:
Example 1 Silicone-modified urethane acrylate C
Example 2 Silicone-modified urethane acrylate B
Example 3 Silicone-modified urethane acrylate (Freeman Co. 19 - 4842)
Example 4 Methacryloxysilane (Toray Silicone K.K. SZ 6030)
Example 5 Acrylate-modified polysiloxane (Chisso K.K. PS 583)
Example 6 Silicone-modified urethane acrylate D
Co. Example 1 Silicone oil (Toshiba Silicone K.K. TSF 4446)
Co. Example 3 Silicone-modified urethane acrylate (Freeman Co. 19 - 4842)
*2 NIHONKAYAKU K.K. KAYARAD DPHA
Mixture of dipentaerythritolhexaacrylate with dipentaerythritol-monohydroxypentaacrylate (40% by mole)

TABLE 2

|  | Ex. 1 | Ex. 2 | Ex. 3 | Ex. 4 | Ex. 5 | Ex. 6 | Co. Ex. 1 | Co. Ex. 2 | Co. Ex. 3 | Co.Ex. 4 |
|---|---|---|---|---|---|---|---|---|---|---|
| Adhesion (crosscut cellotape test) | 100/100 | 100/100 | 100/100 | 100/100 | 100/100 | 100/100 | 100/100 | 50/100 | 29/100 | 100/100 |
| Surface hardness (Taber abrasion test) ($\Delta$ haze =) | 5 | 7 | 8 | 11 | 7 | 6 | 7 | 21 | 15 | 6 |
| Slip performance (dynamic friction coefficient, $\mu k$) | 0.12 | 0.11 | 0.11 | 0.15 | 0.13 | 0.11 | 0.10 | 0.28 | 0.32 | 0.31 |
| Surface water repellency (Contact angle) | 102° | 100° | 98° | 95° | 99° | 100° | 99° | 65° | 67° | 66° |
| Migration | None | None | None | None | None | None | Migrated | None | None | None |
| Heat resistance (heat gradient test) | $\geq$12 sec. | $\geq$12 sec. | 12 sec. | 10 sec. | 11 sec. | $\geq$12 sec. | 11 sec. | 3 sec. | 5 sec. | 12 sec. |
| Crue shirinkage of cured coating | None | None | None | None | None | None | None | Cured | Cured | None |

What is claimed is:

1. An article comprising a substrate and a cured coating or layer of a curable phosphazene composition provided on a surface of the substrate, the curable phosphazene composition comprising from 10 to 99.5 parts by weight of a curable phosphazene compound which is a compound as represented by the general formula (I):

$$\mathrm{+NP(X)}_a\mathrm{(Y)}_b\mathrm{\mathord{\overline{\mathrm{]}}}}_n \qquad (I)$$

wherein
a and b are real numbers, in which a is greater than 0 and b is equal to or greater than 1, provided, however, that $a+b=2$;
n is 3 to 18;
X is a group having a reactive double bond; and
Y is a non-curable group;
and from 0.5 to 90 parts by weight of a silicone-modified curable compound having a (meth)acrylate group.

2. An article as claimed in claim 1, wherein the silicone-modified curable compound is a compound which contains a silicone group and a (meth)acrylate group in one molecule.

3. An article as claimed in claim 1, wherein the silicone-modified curable compound is a silcione-modified urethane (meth)acrylate, a (meth)acrylooxysilane compound or a (meth)acrylate-modified polysiloxane.

4. An article as claimed in claim 1, wherein the silicone-modified curable compound is a silicone-modified (meth)acrylate as represented by the following general formula:

$$\mathrm{A-B-O-R^8-\underset{\underset{R^9}{|}}{\overset{\overset{R^9}{|}}{Si}}-(O-\underset{\underset{R^{10}}{|}}{\overset{\overset{R^{10}}{|}}{Si}})_s-(O-\underset{\underset{R^9}{|}}{\overset{\overset{R^9}{|}}{Si}})_t R^8-O-B-A}$$ or $$-\underset{\underset{R^9}{|}}{\overset{\overset{R^9}{|}}{(Si)}}_u-\underset{\underset{R^8-O-B-A}{|}}{\overset{\overset{R^9}{|}}{(Si-O)}}_w-$$

(where
s and t are each from 0 to 4,000;
u is 10 to 1,000;
w is 2 to 100;
B is group derived from a diisocyanate compound;
A is a residue obtainable from a hydroxy group-containing (meth) acrylate;
$R^8$ is a linear or branched alkylene group or a single bond;

$R^9$ and $R^{10}$ are identical to or different from each other and each is methyl or a phenyl group); or a (meth)acrylate-modified polysiloxane or a (meth)acryloxysilane compound, as represented by the following general formula:

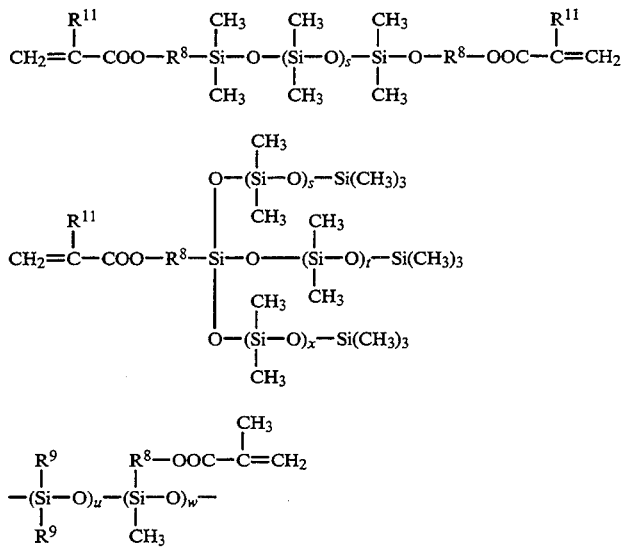

(wherein
$R^8$, $R^9$, s, t, u and w have the same meanings above;

$R^{11}$ is hydrogen atom or methyl; and
x is 0 to 4,000).

5. An article as claimed in claim 1, wherein the curable phosphazene compound is contained in an amount ranging from 30 to 98 parts by weight and the silicone-modified curable composition is contained in an amount ranging from 2 to 70 parts by weight.

* * * * *